United States Patent
Rekimoto (10) Patent No.: US 7,224,343 B2
(45) Date of Patent: May 29, 2007

(54) INPUT APPARATUS, PORTABLE ELECTRONIC DEVICE AND INPUT METHOD FOR A PORTABLE ELECTRONIC DEVICE

(75) Inventor: Junichi Rekimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 655 days.

(21) Appl. No.: 10/774,421

(22) Filed: Feb. 10, 2004

(65) Prior Publication Data
US 2004/0164954 A1  Aug. 26, 2004

(30) Foreign Application Priority Data
Feb. 21, 2003  (JP)  ............... 2003-044148

(51) Int. Cl.
  *G09G 3/34*  (2006.01)
(52) U.S. Cl. ............... 345/156; 345/157; 345/158; 345/160
(58) Field of Classification Search ........... 345/156, 345/157, 158, 160
  See application file for complete search history.

(56) References Cited

U.S. PATENT DOCUMENTS 6,658,272 B1 * 12/2003 Lenchik et al. .......... 455/575.1
6,791,597 B2 * 9/2004 Ando et al. .............. 348/14.02

FOREIGN PATENT DOCUMENTS

JP  2002-244787  *  8/2002

* cited by examiner

*Primary Examiner*—Richard Hjerpe
*Assistant Examiner*—Leonid Shapiro
(74) *Attorney, Agent, or Firm*—Olbon, Spivak, McClelland, Maier & Neustadt, P.C.

(57) ABSTRACT

There is provided an input apparatus which makes it possible to reduce the size and weight of the apparatus on which it is mounted while improving the ease of use through its jog dial functionality. On a joint section for allowing a first housing and a second housing to be opened to a predetermined angle is provided the input apparatus (jog dial function section) that functions as a jog dial. This input apparatus is formed on at least a part of a cylindrical section of a structure in which the cylindrical section, which is part of the second housing, is fitted between a pair of shoulder portions of the first housing. As used above, "at least a part" refers to an area that can be touched by a user's finger when the first housing and the second housing are opened.

15 Claims, 12 Drawing Sheets

INPUT APPARATUS, PORTABLE ELECTRONIC DEVICE AND INPUT METHOD FOR A PORTABLE ELECTRONIC DEVICE

CROSS REFERENCE TO RELATED APPLICATIONS

The present document claims priority to Japanese Priority Document JP 2003-044148, filed in the Japanese Patent Office on Feb. 21, 2003, the entire contents of which are incorporated herein by reference to the extent permitted by law.

BACKGROUND OF THE INVENTION

1. Field of the Invention

The present invention relates to an input apparatus for a portable electronic device that is configured relatively small so as to be portable. Further, the present invention relates to a portable electronic device, and in particular to portable electronic device and input method for a portable electronic device that use jog dial functionality for input operation.

2. Description of Related Art

Figure 19:
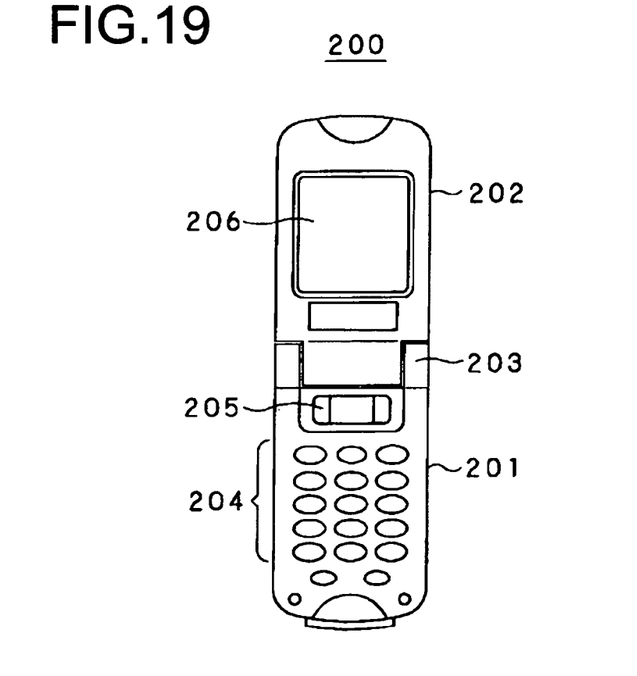
FIG. 19 is a plan view showing the external appearance of a conventional mobile telephone terminal.

Today, portable electronic devices such as mobile telephone terminals having, in order to make it possible to perform complex input operations simply, an input apparatus commonly referred to as a jog dial have been commercialized. FIG. 19 shows an example of one such mobile telephone terminal having a conventional jog dial input apparatus. This mobile telephone terminal 200 is constructed in such a manner that a first housing 201 and a second housing 202 are joined at a joint 203 so as to be foldable. In such a case, keys 204, such as function keys, and a jog dial 205 are provided on the first housing 201, and a display section 206 is provided on the second housing 202.

The jog dial 205 rotates, with a rotation shaft formed in the longitudinal direction of the dial at the center, in a given direction and the direction opposite thereto. Therefore, it is configured with a rotatable member, and further, the jog dial can be pressed inward towards the rotation shaft. In this case, the rotation of the rotation member is accompanied by some clicking feeling, and, for example, each time the rotation member is rotated by a given angle, such as a few ten degrees, a mechanical click occurs.

Such a jog dial 205 enables various operations that combine a rotational operation and a pressing operation. For example, a selection of an item to be inputted (for example, text) may be performed through rotation, and the selected item may be confirmed by pressing. In addition, operations such as menu selection with a finger are made possible. Thus, with a jog dial, various operations can be performed easily with just one operation means. And, as mentioned above, by having a mechanical click occur every time the jog dial is rotated by a given angle, the user is, based on the number of clicks that have occurred, able to know how much input has been given (for example, how many steps), and the ease of use is improved.

In addition, in Japanese Patent Application Publication No. 2002-244787, there is disclosed a particular configuration of a mobile information device in which a mechanical jog dial is provided on a hinge section, and in which the mechanical jog dial is exposed even when the display panel is folded.

SUMMARY OF THE INVENTION

However, since such a conventional jog dial input apparatus requires an operation member that is provided so as to be rotatable, components of the input apparatus become relatively large as compared to a case where only push-buttons are arranged on the device. In the example shown in FIG. 19, there are more operation members included in the jog dial 205 than can be seen from the outside on the housing, and much of the space inside the device is taken up by those components. Therefore, in trying to reduce the size and weight of the device as a whole, the size and weight of the jog dial impose some restrictions. However, when the radius of the jog dial is made excessively small, ease of use is compromised.

In addition, even with respect to Japanese Patent Application Publication No. 2002-244787 in which is disclosed a configuration where a jog dial is provided on a hinge section of a mobile information device, in configuring the jog dial, there is a need to incorporate numerous mechanical components inside the hinge, and the device therefore can only be made so small and light.

The present invention is made in view of such circumstances, and seeks to provide an input apparatus which makes it possible to reduce the size and weight of a device, on which it is mounted, as a whole while keeping the jog dial functionality and improving the ease of use.

In addition, the present invention seeks to provide a portable electronic device and an input method for a portable electronic device which allow the size and weight of the device as a whole to be reduced while keeping the jog dial functionality and improving the ease of use.

An input apparatus related to an embodiment of the present invention may be an input apparatus that is provided on a housing of a portable electronic device and through which input operations are performed by a user, and the input apparatus may include: a contact detection sensor that detects contact by a living organism or an object based on an input operation by a user with a portion of the surface of a cylinder as a detection area, the contact detection sensor being provided in close proximity to a rotating component that the above-mentioned portable electronic device is equipped with; control means that performs input processing for accepting input of a predetermined function depending on a contact position, on a change in the contact position or on the area of a contacted portion detected by the above-mentioned contact position sensor, and for outputting an actuating signal based on a change in the above mentioned contact position that equals or exceeds a predetermined amount or on the size of the area of the contacted portion; and an actuator for temporarily vibrating at least an area close to where the above-mentioned contact detection sensor is located by the actuating signal outputted by the above-mentioned control means.

The control means performs the input processing for accepting input of a predetermined function depending on the contact position, on a change in the contact position or on the area of the contacted portion detected by the contact detection sensor, and the control means outputs the actuating signal based on a change in the contact position that equals or exceeds a predetermined amount and/or on the area of the contacted portion. The actuator, by way of the actuating signal outputted by the control means, temporarily vibrates an area close to where the contact detection sensor is provided. The user experiences such a feeling as if s/he has just operated a jog dial.

A portable electronic device related to an embodiment of the present invention may be a portable electronic device that includes a rotating component, the portable electronic device including: an input apparatus including a contact detection sensor that detects contact by a living organism or an object based on an input operation by a user with a portion of the surface of a cylinder as a detection area, the contact detection sensor being provided in close proximity to the above-mentioned rotating component, control means that performs input processing for accepting input of a predetermined function depending on a contact position, on a change in the contact position or on the area of the contacted portion detected by the above-mentioned contact position sensor, and for outputting an actuating signal based on a change in the above mentioned contact position that equals or exceeds a predetermined amount or on the area of a contacted portion, and an actuator for temporarily vibrating at least an area close to where the above-mentioned contact detection sensor is located by way of the actuating signal outputted by the above-mentioned control means; and information processing means for performing, in response to an input from the above-mentioned input apparatus, information processing as desired by a user.

The control means of the input apparatus performs the input processing for accepting input of a predetermined function depending on the contact position, on the change in the contact position or on the area of the contacted portion detected by the above-mentioned contact position sensor, and outputs the actuating signal based on a change in the contact position that equals or exceeds a predetermined amount and/or the size of the area of the contacted portion. The actuator, by way of the actuating signal outputted by the control means, temporarily vibrates an area close to where the contact detection sensor is positioned. Thus, the user experiences a feeling that is comparable to operating a jog dial.

An input method related to a present invention and which is for a portable electronic device may be an input method for a portable electronic device that has a rotating component, the input method including: an input processing step of performing input processing for accepting input of a predetermined function depending on a contact position, a change in the contact position, or the area of a contacted portion detected by a contact detection sensor, which is provided in close proximity to the rotating component, that detects contact by a living organism or an object based on an input operation by a user with a portion of the surface of a cylinder as a detection area; an actuating signal outputting step of outputting an actuating signal based on a change in the above-mentioned contact position that equals or exceeds a predetermined amount or on the size of a contacted portion; and a vibrating step of temporarily vibrating, by way of the actuating signal outputted in the above-mentioned actuating signal outputting step, at least an area that is close to where the above-mentioned contact detection sensor is provided.

In the input processing step, input of a predetermined function is accepted depending on the contact position, on the change in the contact position or on the area of the contacted portion detected by the contact detection sensor. In the actuating signal outputting step, the actuating signal is outputted based on a change in the contact position that equals or exceeds a predetermined value and/or the size of the contacted portion. In the vibrating step, by way of the actuating signal outputted by the actuating signal outputting step, an area close to where the contact detection sensor is positioned is temporarily vibrated. The user thus experiences a feeling that is comparable to operating a jog dial.

Further, according to another aspect of the present invention, there may be provided detection means having a detection surface that is capable of detecting the position of a portion contacted/approached by a human body or of detecting a two-dimensional value (such as the shape or area of the contacted portion), and an electronic device may be made to perform a corresponding process with the detection result by the above-mentioned detection means and/or changes thereto as user input. This detection means may be configured so that the capacitance changes where a human body makes contact or comes close to as described in, for example, Japanese Patent Application Publication No. 2002-342033 and International Publication No. WO02/095563. In detecting two-dimensional values, not only position and direction, but also the pressure of input and the like, for example, may be detected.

According to the configuration disclosed in these documents, even if, for example, the detection surface of the detections means is stationary in relation to the housing, input operations by a user is possible. Therefore, an input apparatus of fewer mechanical components can be realized. In addition, by incorporating this structure into a hinge section of a portable device, its housing or some other component, it can be used as input means, such as a jog dial and the like, with ease.

In addition, it is also possible to configure the detection means in such a manner that, in response to a detection result by the detection means and/or changes thereto, appropriate feedback, such as, for example, visual, audio and/or tactile feedback, is returned to the user. In such a case, it is preferable that a plurality of input processing states be provided by combining, as deemed appropriate, proximal contact positions, two-dimensional values and/or changes thereto. Specifically, such feedback technology as disclosed in Japanese Patent Application Publication Nos. 2003-288158 and 2003-223265 may be used.

In the present configuration, two-dimensional values and/or changes thereto may be detected as binary values or in multiple levels, and further they may be detected continuously. When non-continuous detection is performed, depending on the application, an appropriate threshold value is set. In addition, it is preferable that this configuration be realized by combining appropriate software and hardware.

The contents of Japanese Patent Application Publication Nos. 2002-342033, 2003-288158 and 2003-223265 and International Publication No. WO02/095563 are incorporated herein by reference.

DESCRIPTION OF THE PREFERRED EMBODIMENTS

Figure 1:
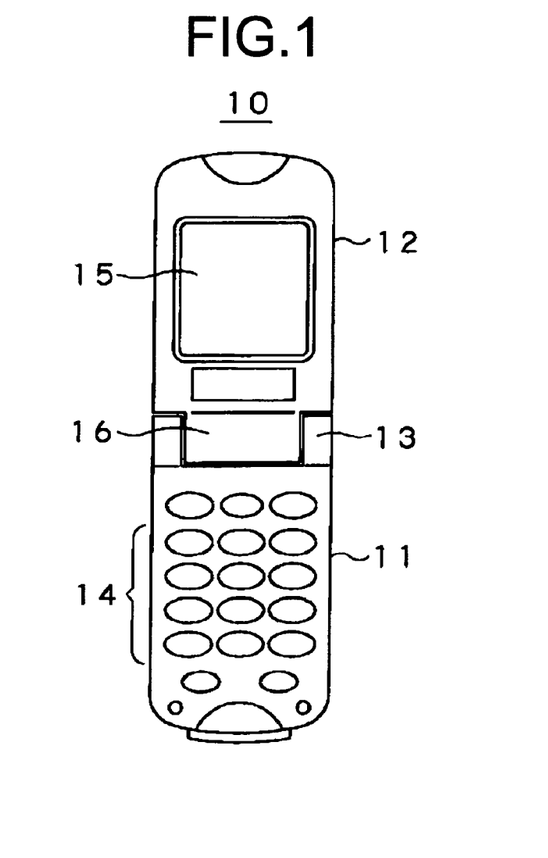
FIG. 1 is a plan view showing the external appearance of a mobile telephone terminal according to the first embodiment of the present invention.
Figure 2:
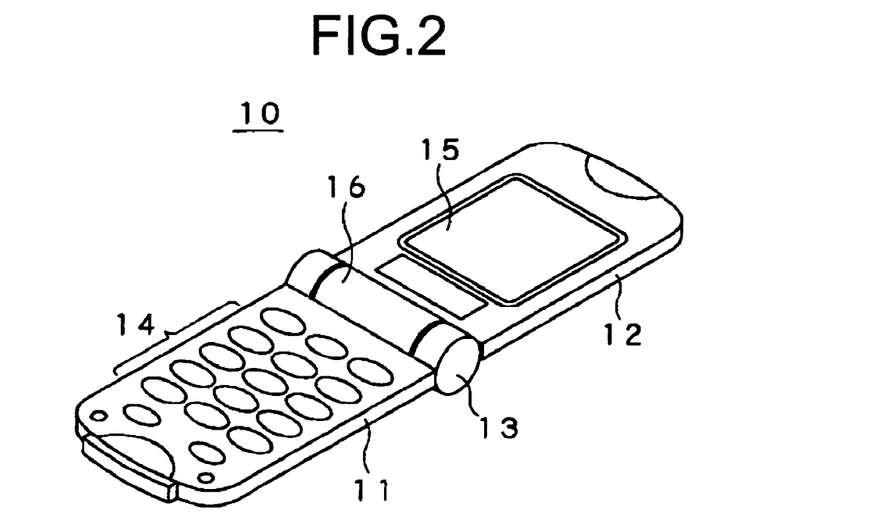
FIG. 2 is a perspective view showing the external appearance of the mobile telephone terminal in FIG. 1.
Figure 3:
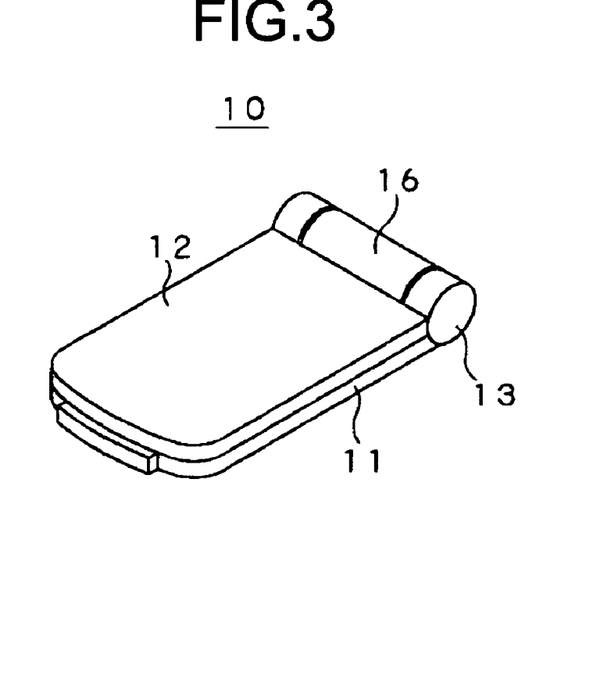
FIG. 3 is a perspective view showing the external appearance of the mobile telephone terminal in FIG. 1 with its first housing and second housing folded together.

Hereinafter, several embodiments of the present invention will be described with reference to the drawings. The first embodiment is a mobile telephone terminal 10 whose external appearance is shown in FIGS. 1, 2 and 3. This mobile telephone terminal 10 has a first housing 11 and a second housing 12 joined by a joint section 13 comprised of a hinge so that they may be opened to an arbitrary angle. On the surface of the first housing 11 that faces the second housing 12 are provided keys 14 including function keys. On the surface of the second housing 12 that faces the first housing 11 is provided an LCD 15 as an example of a display section.

Figure 4:
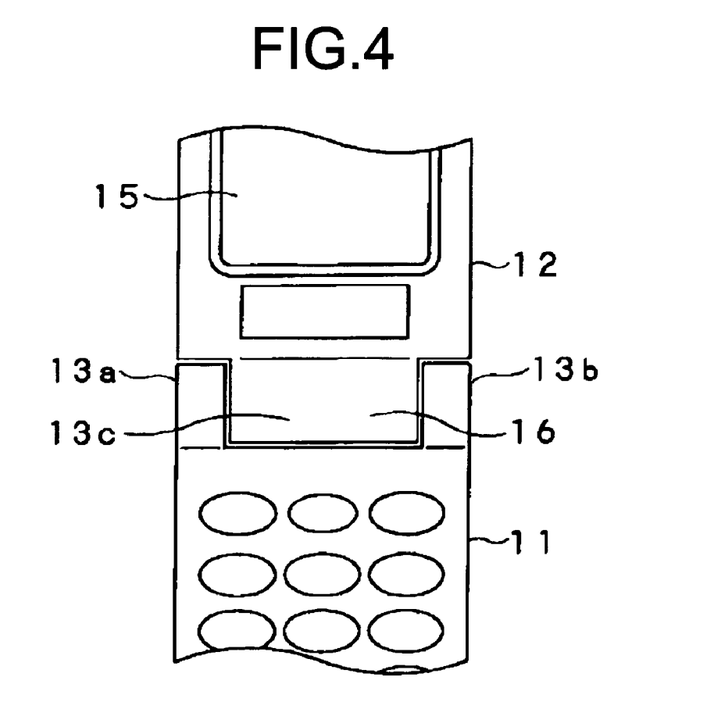
FIG. 4 is an enlarged view of an input apparatus formed on a joint section of the mobile telephone terminal in FIG. 1.

In addition, an input apparatus (jog dial function section) 16 that functions as a jog dial is provided on the joint section 13. The input apparatus 16, as shown enlarged in FIG. 4, is formed on at least a portion of a cylindrical section 13c of the second housing 12 that is fitted between shoulder sections 13a and 13b of the first housing 11 through a common shaft so that both housings 11 and 12 are rotatable in relation to each other. "At least a portion" as used above refers to an area, as shown in FIG. 4, that a user can touch when the first housing 11 and the second housing 12 are opened. This area represents the detection area that will be described later.

Figure 5:
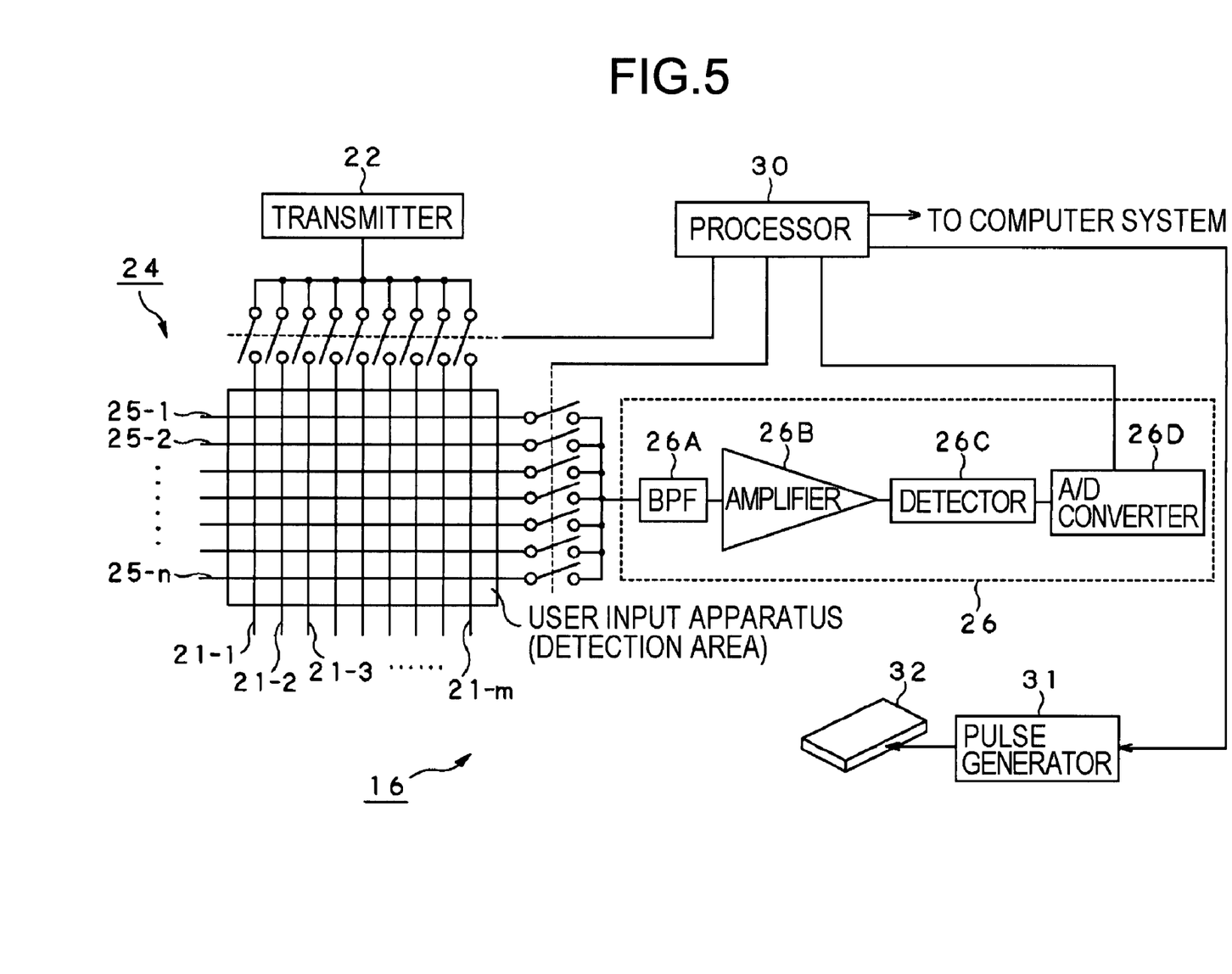
FIG. 5 is a diagram illustrating the configuration of the input apparatus in FIG. 4 with its contact detection sensor illustrated flat.

As shown in FIG. 5, the input apparatus is comprised of a contact detection sensor 24 for detecting contact by a living organism or an object with a portion of the surface of the cylindrical section 13c as a detection area, and a processor 30 that judges user input based on a detection output from the contact detection sensor 24, and outputs an actuating signal. FIG. 5 is a schematic view of the contact detection sensor 24 of the input apparatus 16 that is formed on a portion of the cylindrical section 13c and shows the contact detection sensor 24 as laid out flat.

The contact detection sensor 24 is positioned in close proximity to a rotating component that a portable electronic device has, and detects contact by a living organism or an object based on a user with a portion of the surface of a cylinder as a detection area. As shown in FIG. 5, the contact detection sensor 24 is comprised of a plurality of linear transmission electrodes 21-1, 21-2, . . . , 21-$m$, a transmitter 22 for supplying an AC current of a predetermined frequency (for example, 100 KHz) for transmission to each of the transmission electrodes 21-1 through 21-$m$, a plurality of linear reception electrodes 25-1, 25-2, . . . , 25-$n$ for receiving the AC current from the transmission electrodes 21-1 through 21-$m$ by way of electrostatic inductance, and a receiver 26 for receiving the AC current flowing through the reception electrodes 25-1 through 25-$n$. The receiver 26 is comprised of an AM modulator including a band-pass-filter (BPF) 26A that only allows AC currents within a predetermined frequency range through, an amplifier 26B and a detector 26C, and an A/D converter 26D that converts the detected output to digital signals.

From FIG. 5, it can be seen that the reception electrodes 25-1 through 25-$n$ have crossing points that cross the transmission electrodes 21-1 through 21-$m$, but these electrodes do not contact one another at these crossing points. In other words, at these crossing points where the electrodes cross one another, there is formed a circuitry that is equivalent to a capacitor for accumulating charge. Therefore, when an AC current passes through the transmission electrodes, an AC current flows through the corresponding reception electrodes via these crossing points by way of electrostatic induction. The area where the transmission electrodes 21-1 through 21-$m$ cross reception electrodes 25-1 through 25-$n$ constitute a user input area of the input apparatus 16. This user input area corresponds to the detection area mentioned above.

The transmitter 22 supplies an AC current to each of the transmission electrodes by scanning them. Therefore, at a given moment, an AC current from the condenser-equivalent circuit at the crossing point with the corresponding transmission electrode flows through each of the reception electrodes 25-1 through 25-$m$, and an input position can be detected by way of the positional relationship between the transmission electrode that transmitted the AC current and the reception electrode that received the AC current. For example, by performing a predetermined computation on output signals from the reception electrodes 25-1 through 25-$n$ by the processor 30, user input can be detected through the user input area.

In the example shown in the drawing, the transmission electrodes 21-1 through 21-$m$ are arrayed in a substantially parallel manner, and the reception electrodes 25-1 through 25-$n$ are arrayed so as to be orthogonal to each of the transmission electrodes 21-1 through 21-$m$.

Figure 6:
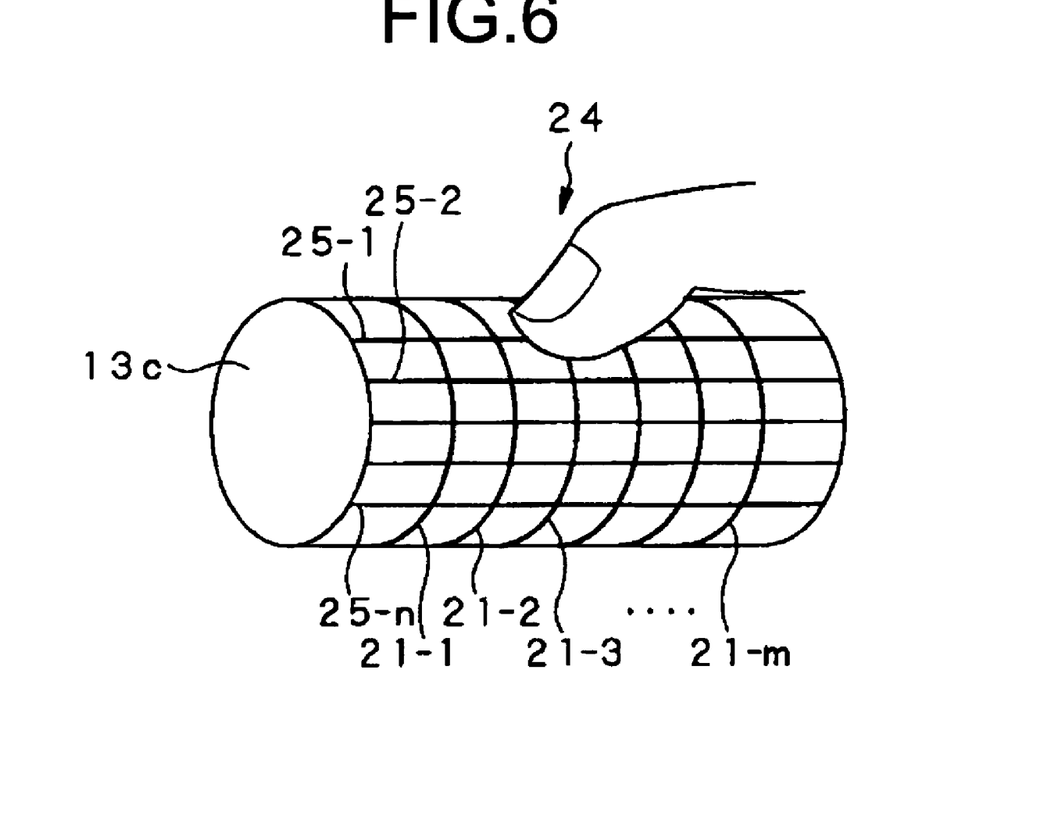
FIG. 6 is an example of the contact detection sensor of the input apparatus mentioned above.

In FIG. 6, there is shown the contact detection sensor 24, which was shown flat in FIG. 5, as provided on the cylindrical section 13c. In order to detect the position of the user's finger on the cylindrical section 13c forming a hinge section, the transmission electrodes 21-1 through 21-$m$ and the reception electrodes 25-1 through 25-$n$ arranged in grids are provided on the surface of the cylindrical section 13c. Either a thin insulation sheet is provided thereon, or an insulation film is applied thereon. Naturally, the crossing points between the transmission electrodes and the reception electrodes are insulated.

Figure 7:
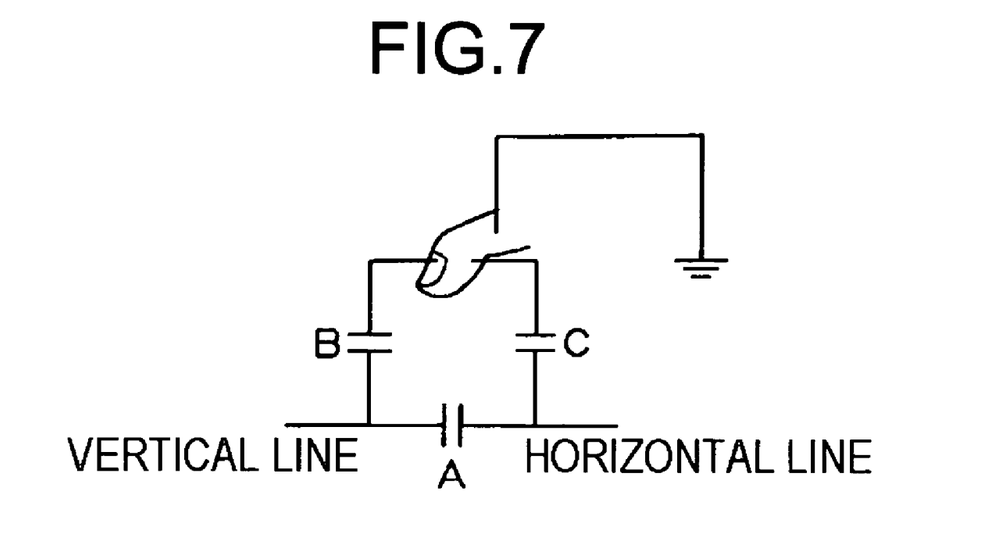
FIG. 7 is a diagram illustrating the principles of the contact detection sensor mentioned above.

Each of the crossing points, as shown in FIG. 7, is capacitively coupled by capacitance A, and the AC current applied to the vertical line (the transmission electrodes 21-1 through 21-*m*) can be detected from the current I generated in the horizontal line (the reception electrodes 25-1 through 25-*n*) through the following equation:

$$I = 2\pi fCV \tag{1}$$

where f, V and C represent AC signal frequency, applied voltage and capacitance of the crossing point.

Under these circumstances, when a finger is brought close to a crossing point, due to the capacitances (B and C) between the finger and the vertical and horizontal lines, part of the current mentioned above flows to the ground via the finger, as a result of which the current obtained through equation (1) above decreases. By applying an AC current to the vertical line in a time-sharing manner, and measuring the current of the horizontal line, the X and Y positions of the finger can be found. In addition, if the finger is pressed hard, the portion contacted would span a plurality of crossing points, and the area of the contacted portion can be found from the X and Y positions of the plurality of crossing points. Therefore, by setting a predetermined threshold value and comparing the threshold value and the area of the contact portion, a judgment as to whether a pressing operation has been performed can be made.

Based on data supplied from the A/D converter 26D, the processor 30 judges the operational status of the input apparatus 16, and outputs to a computer system and the like a command obtained based on that judgment on the operational status. In the present example, based on the data supplied via the A/D converter 26, the processor 30 judges the operational status of the input apparatus 16 from the change in the contact position of a finger or in the area of the portion contacted by the finger on the input apparatus 16.

Further, from the A/D converted output signals from the reception electrodes 25-1 through 25-*n*, each time there is found a change in contact position or in the area of the portion contacted that exceeds a predetermined value, the processor 30 outputs an actuating signal to a pulse generating section 31. The pulse generating section 31 generates a pulse signal in response to the actuating signal, and supplies it to a transducer 32. When the pulse signal is supplied, the transducer 32 vibrates, for example, an area in close proximity to the input apparatus 16. A feedback system of such a configuration and which gives a tactile feeling to an area close to the contact detection sensor is called a tactile feedback system.

The transducer 32 of such a tactile feedback system is comprised of a flexible piezo-actuator. For example, the transducer may be so configured that one end thereof is fixed and a weight is attached to the other end. In addition, another example would include one which is comprised of a flexible piezo-actuator, has both ends fixed (bridge configuration), and which has a weight attached in the middle. Further, the transducer 32 may be comprised of a multi-layered flexible piezo-actuator. A multi-layered flexible piezo-actuator is comprised of an upper layer piezo-actuator and a lower layer piezo-actuator. A piezo-actuator expands and contracts depending on the direction of the voltage that is applied. By applying a voltage across the upper layer that is opposite in direction to that of the lower layer, the upper layer may contract while at the same time the lower layer expands. As a result, the multi-layered flexible piezo-actuator bends upward or downward as a whole.

The pulse signal outputted by the pulse generating section 31 may be a single cycle of a pulse signal of a frequency of, for example, approximately 20 Hz. In the present example, such control where each time the processor 30 detects that the position on the detection area mentioned above touched by a finger changes by a predetermined angle (for example, every 30°), a pulse signal for temporarily vibrating the transducer 32 is outputted is carried out.

The processor 30 may be control means separately provided for the input apparatus 30, or alternatively, the controller of the electronic device into which the input apparatus is incorporated may also serve as the processor 30.

Figure 8:
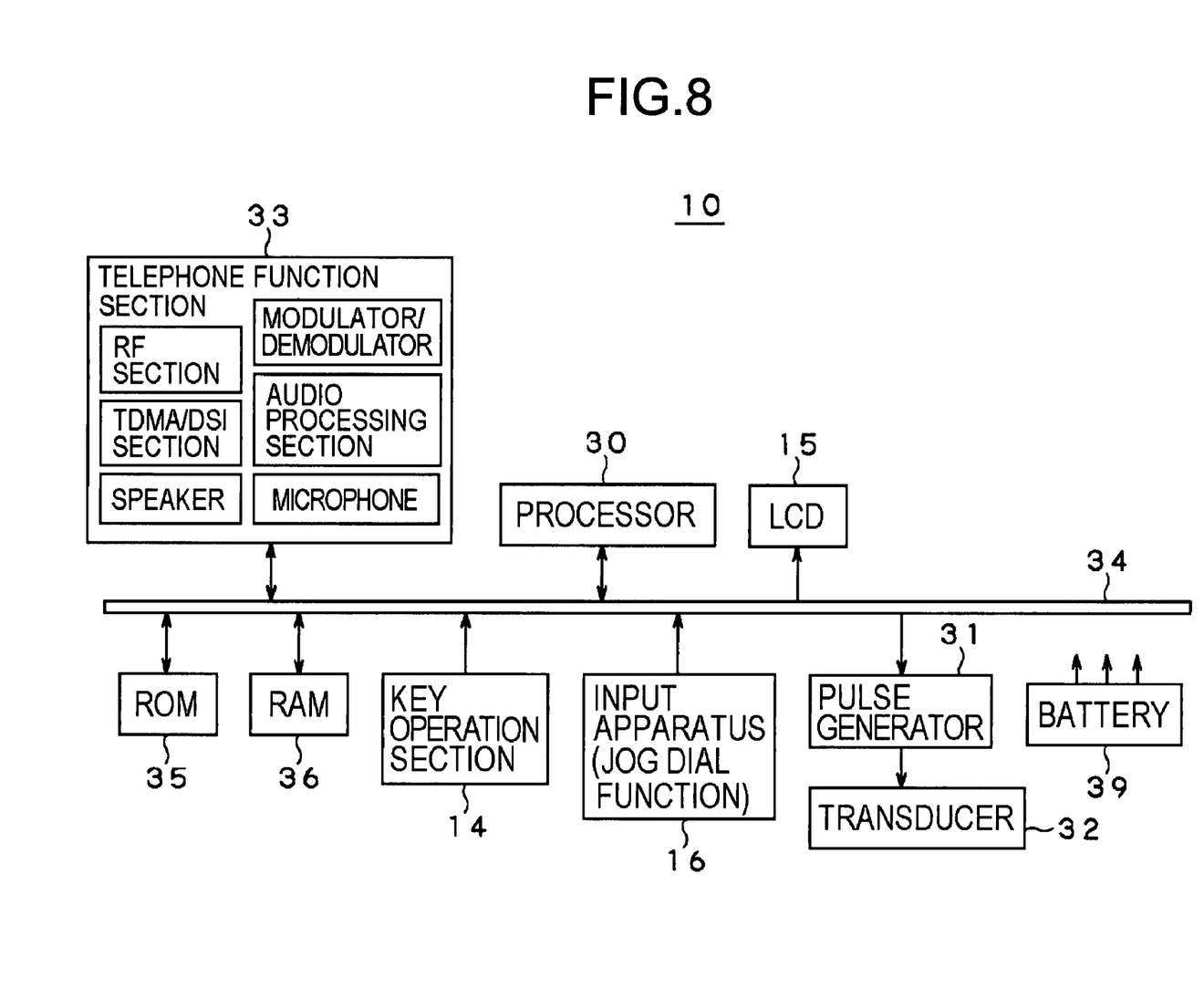
FIG. 8 is a block diagram showing the internal configuration of the mobile telephone terminal.

Next, the internal configuration of the mobile telephone terminal 10 will be described with reference to FIG. 8. In the mobile telephone terminal 10 shown in FIG. 8, a telephone function section 33, ROM 35, RAM 36, a key operation section 14, an input apparatus 16, and a liquid crystal display (LCD) 15 are connected to the processor 30 via a bus 34. In addition, the mobile telephone terminal uses a battery 39 as power supply. The telephone function section 33 includes components, such as an RF section, a demodulation section, a modulation section, a TDMA/DSI processing section, an audio processing section, a speaker, a microphone and the like, that are directly related to audio transmission/reception.

As described above, based on data supplied from the A/D converter 26D of the receiver 26 of the input apparatus (jog dial function section) 16, the processor 30 judges changes in the contact position of a finger on the input apparatus 16 or changes in the area of the contacted portion, and judges from such changes the operative status of the input apparatus 16. In addition, each time the contact position or the area of the contacted portion exceeds a predetermined value, the processor 30 supplies an actuating signal (pulse signal) from the pulse generating section 31 to the transducer 32. The transducer 32 vibrates based on pulses supplied from the pulse generating section 31.

Various control in accordance with contact detection, transmission control and wireless access control by the TDMA/DSI processing section of the telephone function section 33, audio processing control by the audio processing section, control of the LCD and the like carried out by the processor 30 are all carried out in accordance with respective control programs preset in the ROM 35. Each of the control programs are read from the ROM 35 by the processor 30, and is executed with the RAM 36 as a work area.

Next, a few specific examples of control carried out by the processor 30 in accordance with detection results from the contact detection sensor 24 will be described. The first example is such control where, based on a change in the contact position on the surface of the cylinder in the circumferential direction by a predetermined amount detected by the contact detection sensor 24 of the input apparatus 16, an input operation by the user's finger is judged to be rotation, and where an input operation by the user is judged to be a pressing operation depending on the area of the contacted portion detected by the contact detection sensor 24.

Figure 9:
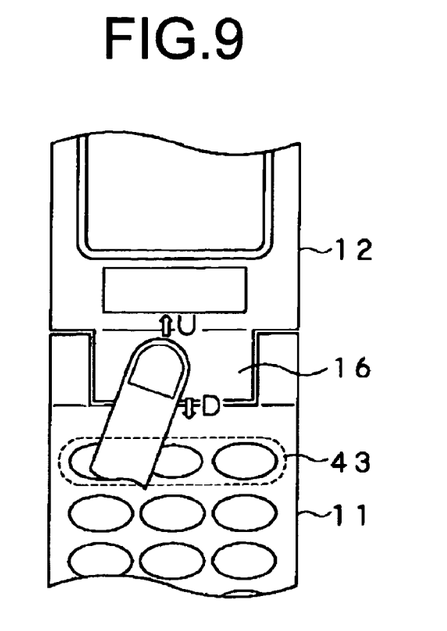
FIG. 9 is a diagram for illustrating an example of the control performed by a processor in response to a detection result by the contact detection sensor.

In FIG. 9, it is assumed that a user has moved his/her finger over the contact detection sensor 24 provided on the surface of the cylinder in the circumferential direction indicated by arrows U and D as if to rotate a dial. In such a case, due to the capacitances (B and C) between the finger and the vertical and horizontal lines as shown in FIG. 7, part of the current flows to the ground through the finger, as a result of which the current obtained from equation (1) above decreases. By supplying an AC current to the vertical lines in a time-sharing manner, and measuring the current of the horizontal lines, the X and Y positions of the finger can be found. As a result, changes in the contact position of the finger can be detected, and the processor 30 can interpret vertical movements by the finger as a rotating operation.

Figure 10:
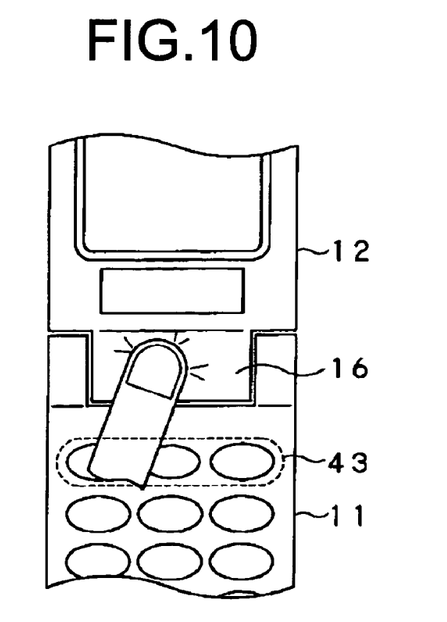
FIG. 10 is a diagram for illustrating an example of the control performed by a processor in response to a detection result by the contact detection sensor.

Assuming the user presses his/her finger hard upon the contact detection sensor 24 as shown in FIG. 10, since the finger would span a plurality of crossing points, the contact detection sensor 24 is able to find the area of the contacted portion from the X and Y positions of the plurality of crossing points. Thus, by setting a threshold value and comparing the threshold value with the area of the contacted portion, the processor 30 is able to make a judgment as to whether a pressing operation has been performed. Thus, the pressing of a finger upon the input apparatus 16 can be interpreted as a dial pressing operation.

Figure 11:
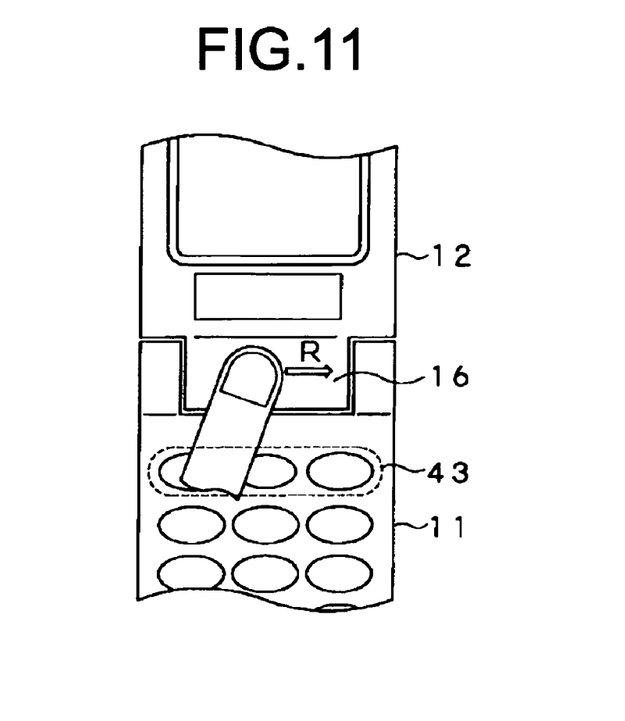
FIG. 11 is a diagram for illustrating an example of the control performed by a processor in response to a detection result by the contact detection sensor.

The second example is similar in terms of the rotating operation shown in FIG. 9, but differs in how the pressing operation is judged. When a user moves his/her finger in a direction that is orthogonal to the circumferential direction upon the contact detection sensor 24 provided on the surface of the cylinder, for example in the direction indicated by arrow R in FIG. 11, since the contact detection sensor 24 is able to find the X and Y positions of the finger as shown in FIGS. 5 and 6, a horizontal change in the contact position of the finger can be detected. In this example, the processor 30 interprets this horizontal movement by the finger as a pressing operation.

Figure 12:
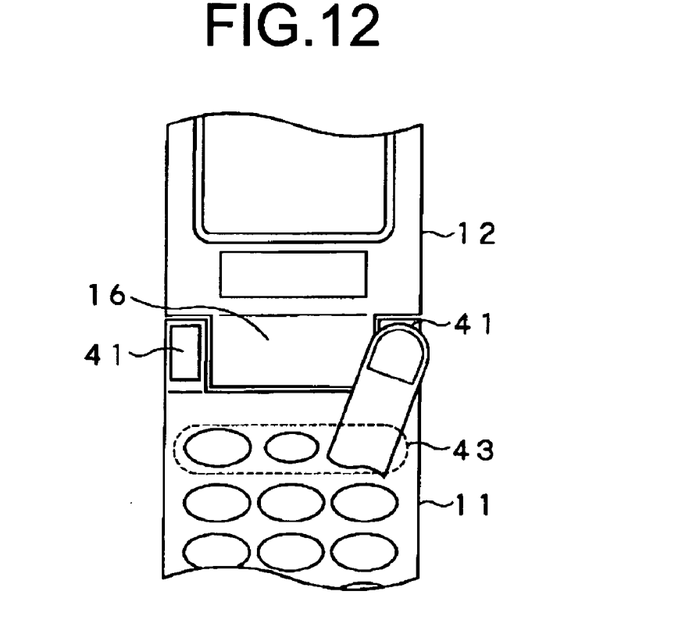
FIG. 12 is a diagram for illustrating an example of the control performed by a processor in response to a detection result by the contact detection sensor.

The third example is similar in terms of the rotating operation shown in FIG. 9, but differs in how the pressing operation is judged. As shown in FIG. 12, a touch sensor 41 is provided on the shoulder section 13b of the first housing, and when the touch sensor 41 is touched, that is interpreted as a pressing operation. The touch sensor 41 may also be provided on the shoulder section 13a on the other side.

Besides interpreting the input operations illustrated in FIGS. 9 through 12, the processor 30 judges from the A/D converted output signals of the reception electrodes 25-1 through 25-n whether the contact position or the area of the contact portion has changed by a predetermined amount or more, and each time it does, it outputs an actuating signal to the pulse generating section 31. In accordance with the actuating signal, the pulse generating section 31 generates a pulse signal and supplies it to the actuator (transducer) 32 for transmitting vibration. The transducer 32, as mentioned above, is comprised of a single-layer or multi-layered flexible piezo-actuator, and by being supplied with the above-mentioned pulse signal, vibrates, for example, an area in close proximity to the input apparatus 16 (such as the area 43 indicated with a broken line). Thus, the input apparatus 16 is able to generate a jog dial-like sense of click each time it is "rotated," and is able to give a user a feeling as if s/he is operating a mechanical jog dial.

Figure 13:
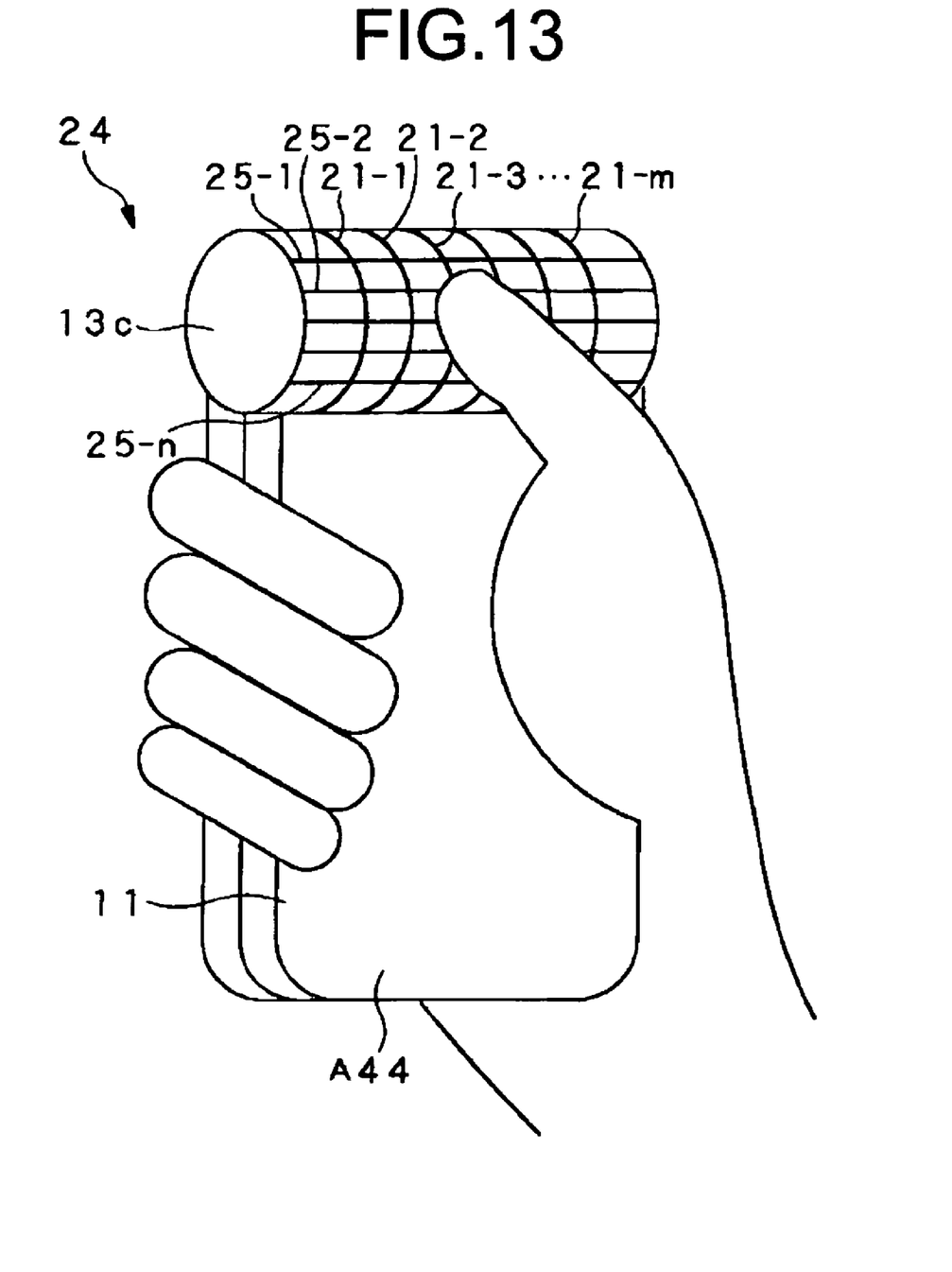
FIG. 13 shows another example of a contact detection sensor of the input apparatus mentioned above.

In FIG. 13, there is shown the configuration of another example of the contact detection sensor 24 that differs from the contact detection sensor 24 shown in FIG. 6. On the cylindrical portion 13c are provided, in a grid-like arrangement, vertical transmission electrodes 21-1 through 21-m and horizontal transmission electrodes 25-1 through 25-n. The crossing points between the vertical transmission electrodes and the horizontal transmission electrodes are insulated. When, for example, the user holds the mobile telephone terminal 10 with his/her right hand, each of the electrodes mentioned above comes close to the user's thumb with, for example, a thin insulation film in between. A reception electrode A44 is provided on the housing 11. The electrode A44 is close to the user's hand with an insulation film in between.

An AC voltage is applied sequentially in a time-sharing manner across the grid-like vertical and horizontal transmission electrodes 21-1 through 21-m and 25-1 through 25-n provided on the surface of the cylindrical section 13c. If the thumb is close to a vertical line across which an AC voltage is applied, the current I that reaches the reception electrode A44 can be calculated through the following equation:

$$I = 2\pi f C V \quad (2)$$

where f, V and C represent AC signal frequency, applied voltage and capacitance between the reception electrode A44 and each transmission electrode, respectively. The current I received by the electrode A44 (see equation (2)) varies depending on the capacitance between the thumb and each of the electrodes. By measuring this value, the X and Y positions of the thumb on the contact detection sensor 24 can be measured.

Figure 14:
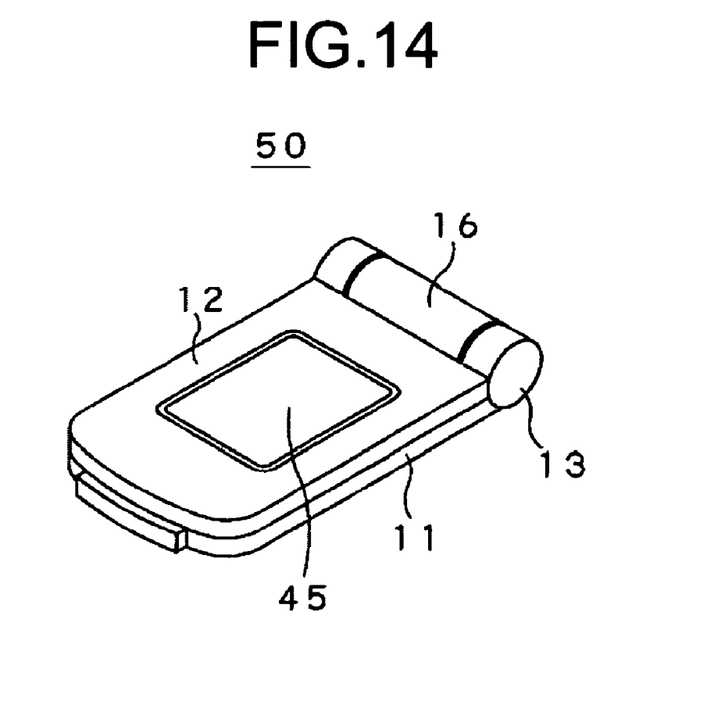
FIG. 14 is a perspective view showing a mobile telephone terminal related to the second embodiment of the present invention in a folded state.
Figure 15:
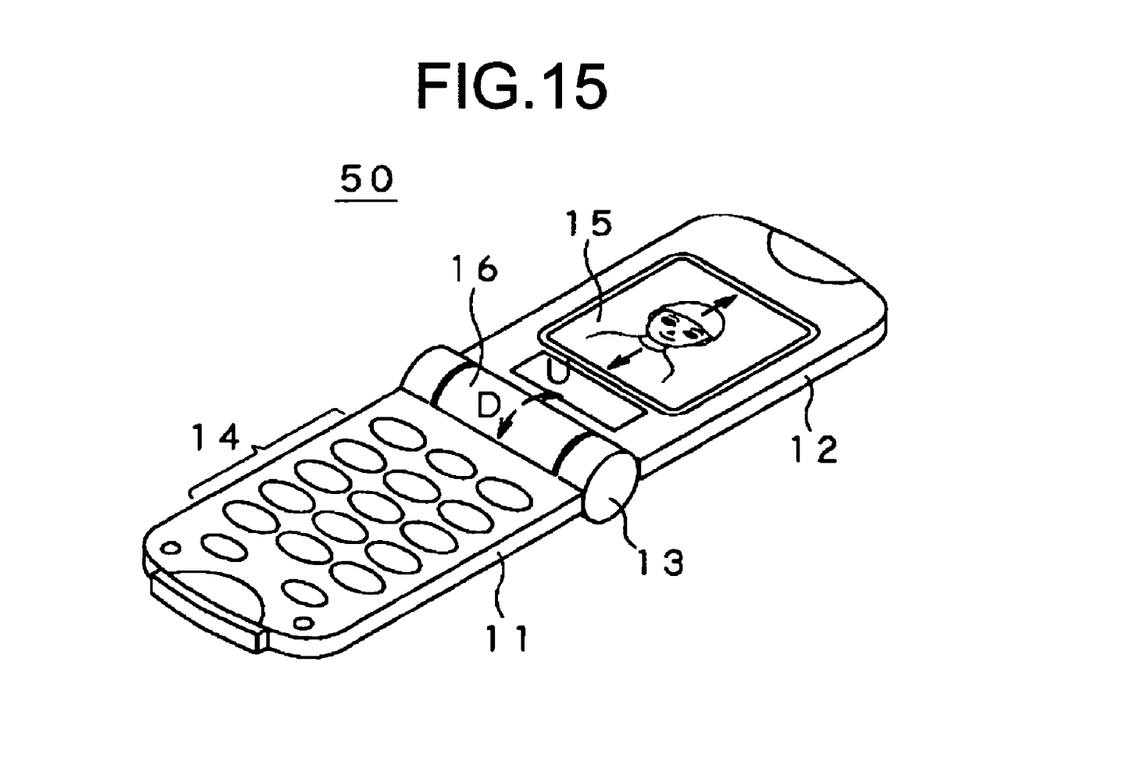
FIG. 15 is a perspective view of the mobile telephone terminal in FIG. 14.

Next, a second embodiment of the present invention will be described. The second embodiment is also a mobile telephone terminal 50, but as shown in FIGS. 14 and 15, on the second housing 12 is provided, besides the LCD 15, an LCD 45 on the reverse side thereof. Even when the mobile telephone terminal 50 is folded in half with the joint section 13 at the center, the LCD 45 can be viewed by a user. Naturally, the input apparatus 16 can be used as an input apparatus for the LCD 45.

In the states shown in FIGS. 14 and 15, although the area of the contact detection sensor 24 of the input apparatus 16 that can be operated by the user (i.e. the detection area) differs, this problem may be overcome by providing the contact detection sensor 24 so as to cover substantially the entire surface of the cylinder so that user operation in both states is made possible. In other words, even in the folded state shown in FIG. 14, the contact detection sensor 24 is exposed.

With such a configuration, when it is detected that the first housing 11 and the second housing 12 have been folded together, the input apparatus 16 switches its input mode. In other words, it is possible to switch between input mode 1 for the LCD 15 and input mode 2 for the LCD 45 by way of an opening-closing movement of the first and second housings 11 and 12.

Figure 16:
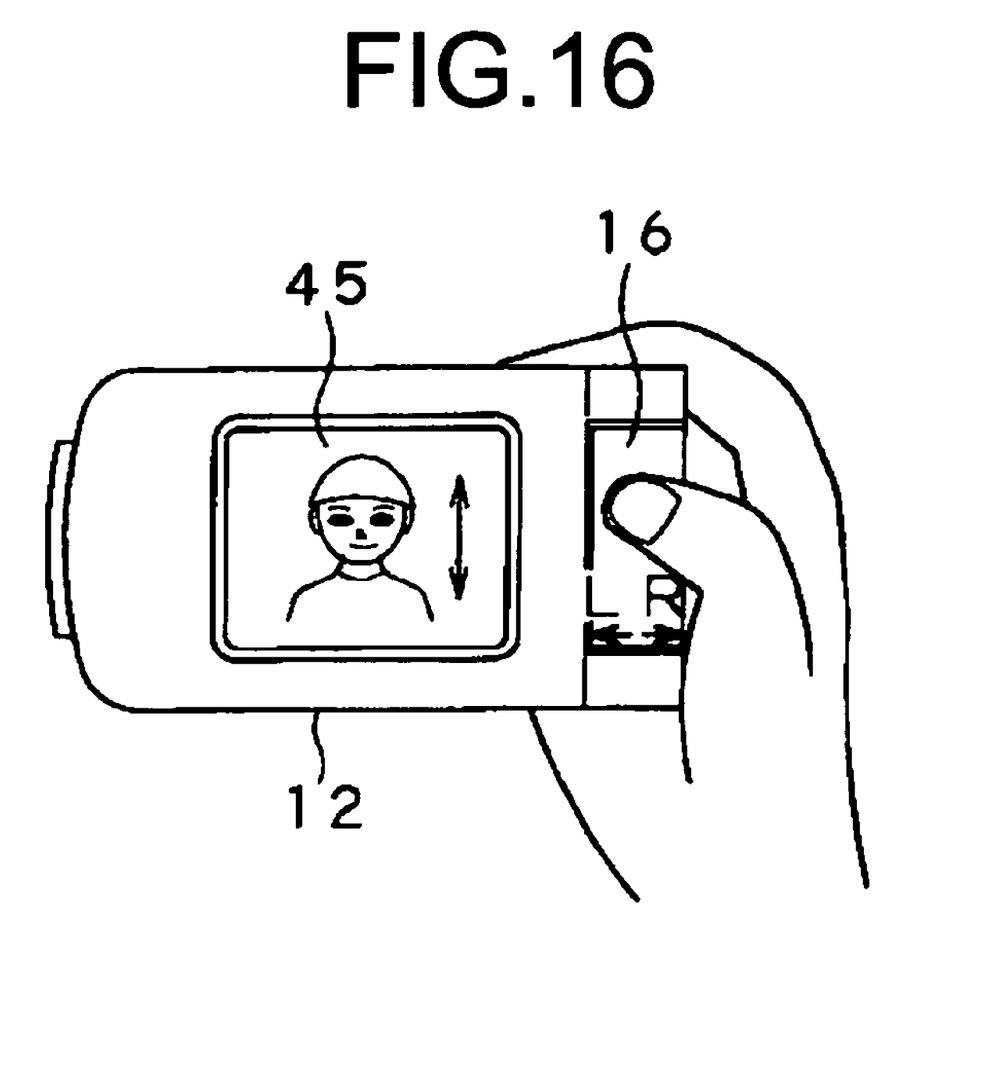
FIG. 16 illustrates another operation mode for the input apparatus mentioned above.

For example, when the first housing 11 and the second housing 12 are opened as shown in FIG. 15, by an operation upon the input apparatus 16 in the direction indicated by arrow U or arrow D, the image shown in portrait mode in the longitudinal direction of the LCD can be scrolled up or down (input mode 1). However, when the mobile telephone terminal 50 is folded in half as shown in FIG. 16, by an operation upon the input apparatus 16 in the direction indicated by arrow R or arrow L, the image shown in landscape mode in a direction that is not the longitudinal direction of the LCD 45 can be scrolled up or down (input mode 2). Naturally, the image can also be scrolled to the right or left. In other words, the input apparatus 16 alters the relationship between the displayed content and the direction of input between the LCD 15 of the second housing 12 and the LCD 45 on the reverse side of the second housing 12.

Figure 17:
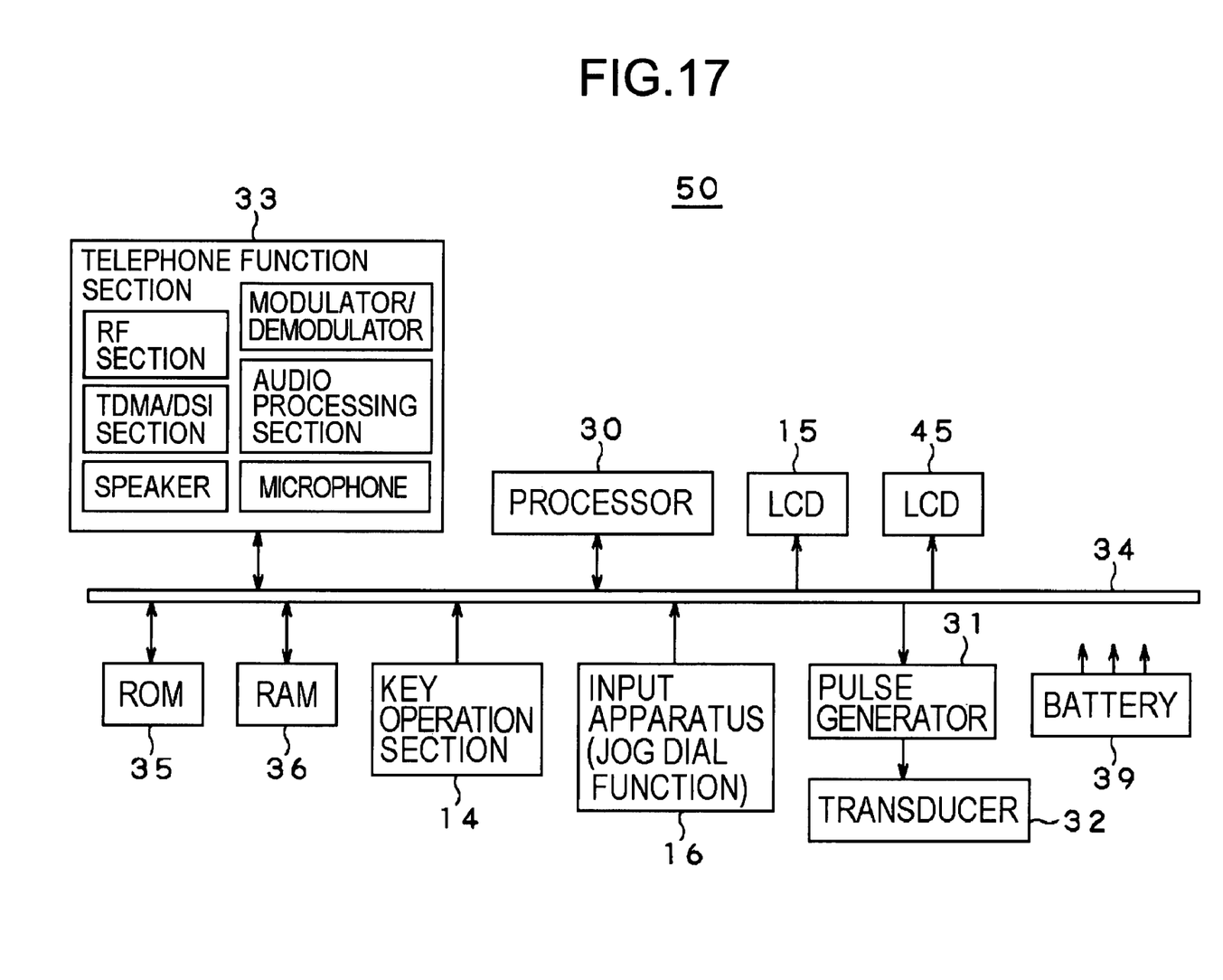
FIG. 17 is a block diagram showing the internal configuration of the mobile telephone terminal in FIG. 14.

FIG. 17 shows the internal configuration of the mobile telephone terminal 50. The configuration differs from that shown in FIG. 8 only in that there is provided an LCD 45 in addition to the LCD 15. When it is detected that the first housing 11 and the second housing 12 have been folded, the processor 30 switches between the input mode for the LCD 15 and the input mode for the LCD 45.

In this mobile telephone terminal 50, the input modes of the input apparatus 16 for the LCD 15 and the LCD 45 were made distinct. However, in the case of a mobile telephone terminal that has only the LCD 15, when it is detected that the mobile telephone terminal has been folded in half, the input mode may be altered to some input mode for performing other operations. For example, if a call is received while folded, the mobile telephone terminal may be so arranged that by pressing the input apparatus 16 while the mobile telephone terminal is still folded, the ring tone can be terminated.

Figure 18:
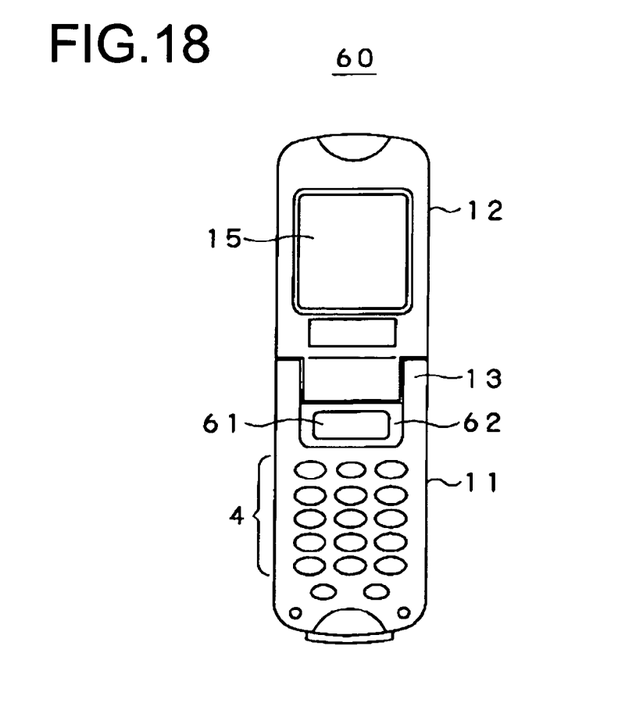
FIG. 18 is a plan view showing the external appearance of another mobile telephone terminal.

In addition, in the mobile telephone terminals 10 and 50, the input apparatus 16 is formed on the joint section 13. However, as an alternate embodiment, a mobile telephone terminal 60 in which a protruding section 61 is formed close to the joint section 13, and in which an input apparatus 62 on which the above-mentioned contact detection sensor 24 is formed is provided on the protruding section 61 is also feasible.

In addition, an input apparatus related to the present invention may be formed on the joint section or protruding section of, besides mobile telephone terminals, portable electronic devices such as portable PDAs, portable personal computers, pagers, portable audio players and video players and the like. Thus, it becomes possible to provide portable electronic devices which can be made smaller and lighter while improving the ease of use and keeping the jog dial functionality.

Since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. An input apparatus that is provided on a housing of a portable electronic device and with which an input operation by a user is performed, comprising:
    a contact detection sensor, which is provided near a rotating component of said portable electronic device, and which detects contact by a living body or an object based on an input operation by said user with a portion of a surface of a cylindrical member as a detection area;
    control means, which performs input processing for accepting input of a predetermined function in accordance with a contact position, a change in said contact position or the area of a contacted portion detected by said contact detection sensor, and which outputs an actuating signal based on a change in said contact position of or above a predetermined amount and/or the size of said area of said contacted portion; and
    an actuator for temporarily vibrating at least an area close to where said contact detection sensor is provided by said actuating signal outputted by said control means.

2. The input apparatus according to claim 1, wherein said contact detection sensor has one or more transmission electrodes to which a specifying signal from a signal source is supplied, and one or more reception electrodes, which are positioned close to said one or more transmission electrodes while being mutually insulated, arranged in said detection area in a predetermined state, and
said control means detects said contact position based on a signal strength of said specifying signal obtained by said one or more reception electrodes.

3. The input apparatus according to claim 1, wherein said contact detection sensor has one or more first transmission electrodes and one or more second transmission electrodes, which is/are positioned close to said first one or more transmission electrodes while being mutually insulated, arranged within said detection area, and a specifying signal from a signal source is supplied to said one or more first and second transmission electrodes,
said contact detection sensor has at least one reception electrode that is insulated from said first and second transmission electrodes and is provided outside said detection area, and
said control means detects said contact position based on a signal strength of said specifying signal obtained by said one or more reception electrodes.

4. The input apparatus according to claim 1, wherein said control means judges an input operation by said user to be a rotational operation based on a change in said contact position of a predetermined amount in a circumferential direction on said surface of said cylindrical member detected by said contact detection sensor, and judges an input operation by said user to be a pressing operation in accordance with said area of said contacted portion detected by said contact detection sensor.

5. The input apparatus according to claim 1, wherein said control means judges an input operation by said user to be a rotational operation based on a change in said contact position of a predetermined amount in a circumferential direction on said surface of said cylindrical member detected by said contact detection sensor, and judges an input operation by said user to be an operation different from said rotational operation in accordance with a change in said contact position of a predetermined amount in a direction that is orthogonal to said circumferential direction on said surface of said cylindrical member detected by said contact detection sensor.

6. The input apparatus according to claim 1, wherein said rotating component is cylindrical, and said contact detection sensor is so provided that a surface of said cylindrical rotating component is said detection area.

7. A portable electronic device, comprising:
    an input apparatus including:
        a rotating component;
        a contact detection sensor that is provided close to said rotating component and that detects contact by a living organism or by an object based on an input operation by a user with a portion of a surface of a cylindrical member as a detection area;
        control means that performs input processing for accepting input of a predetermined function in accordance with a contact position, a change in said contact position and the area of a contacted portion detected by said contact detection sensor, and that outputs an actuating signal based on a change in said contact position of or above a predetermined amount or the area of said contacted portion; and
        an actuator that temporarily vibrates at least an area that is close to where said contact detection sensor is provided; and
    information processing means for performing information processing as desired by said user in accordance with an input from said input apparatus.

8. The portable electronic device according to claim 7, wherein
said rotating component is a joint section that joins a first housing and a second housing so as to be foldable, and said input apparatus is so provided that a surface of said joint section is said detection area.

9. The portable electronic device according to claim 8, wherein said joint section is exposed even when said first housing and said second housing are folded together, and said input apparatus also takes an exposed surface of said joint section while folded to be said detection area.

10. The portable electronic device according to claim 9, wherein first display means for displaying information processing results and progress in information processing by said information processing means is provided on a surface of one of said first housing and said second housing facing the other housing, and second display means with respect to which an operation is performed through said input apparatus in an operation mode that is different from an operation mode for said first display means is provided on one of said first housing and said second housing on a surface on a side opposite to a surface facing the other housing.

11. The portable electronic device according to claim 10, wherein when it is detected that said first housing and said second housing are folded together, an operation mode of said input apparatus with respect to said first display means and said second display means is altered.

12. An input method for a portable electronic device including a rotating component, comprising:

an input processing step of performing input processing for accepting input of a predetermined function in accordance with a contact position, a change in said contact position, or the area of a contacted portion detected by a contact detection sensor that is provided close to said rotating component and that detects contact by a living organism or by an object based on an input operation by a user with a portion of a surface of a cylindrical member as a detection area;

an actuating signal outputting step of outputting an actuating signal based on a change in said contact position of or above a predetermined amount or a size of the area of said contacted portion; and a vibrating step of temporarily vibrating at least an area close to where said contact detection sensor is provided by said actuating signal outputted in said actuating signal outputting step.

13. The input method for said portable electronic device according to claim 12, wherein said rotating component is a joint section for joining a first housing and a second housing so as to be foldable, and a portion of a surface of said joint section is taken to be said detection area in said input processing step.

14. The input method for said portable electronic device according to claim 13, wherein said joint section is exposed even when said first housing and said second housing are folded together, and a surface of said joint section that is exposed while folded is also taken to be said detection area in said input processing step.

15. The input method for said portable electronic device according to claim 14, wherein first display means for displaying an information processing result and progress in information processing is provided on one of said first housing and said second housing on a surface that faces the other housing when said first housing and second housing are folded together, second display means with respect to which an operation is performed in an operation mode that is different from an operation mode for said first display means is provided on one of said first housing and said second housing on a surface on a side opposite to a surface facing the other housing, and when it is detected that said first housing and said second housing are folded together, an operation mode in said input processing step with respect to said first display means and said second display means is altered.

* * * * *